United States Patent [19]

Davis

[11] Patent Number: 4,580,803

[45] Date of Patent: Apr. 8, 1986

[54] CONVENIENCE BASKET, DESK TOP OR TRAY MOUNTING SYSTEM FOR WHEEL CHAIRS

[76] Inventor: Raymond E. Davis, 3636 Remington, Plano, Tex. 75023

[21] Appl. No.: 682,198

[22] Filed: Dec. 17, 1984

[51] Int. Cl.[4] ............................................ B60K 11/00

[52] U.S. Cl. ............................ 280/289 WC; 280/202; 297/155; 297/DIG. 4

[58] Field of Search .............. 280/289 WC, 202, 32.7, 280/33.99 A, 33.99 F, 242 WC; 297/150, 155, DIG. 4, 194, 153, 154; 224/273

[56] References Cited

U.S. PATENT DOCUMENTS

| | | | |
|---|---|---|---|
| 3,369,839 | 2/1968 | Telarico | 297/150 |
| 3,580,631 | 5/1971 | Murcott | 297/155 |
| 3,719,390 | 3/1973 | Haney | 297/DIG. 4 |
| 3,912,032 | 10/1975 | Benz et al. | 280/289 WC |
| 4,526,419 | 7/1985 | Bowman et al. | 297/194 |

*Primary Examiner*—John A. Pekar
*Assistant Examiner*—Mark C. Dukes
*Attorney, Agent, or Firm*—Warren H. Kintzinger

[57] ABSTRACT

A mounting system for a shopping convenience basket, desk top or tray is provided for wheel chairs employing two mounting tubes one to the outside of and below each arm rest. Each mounting tube is mounted with two loop over brackets that are fixed in place on the respective arm rest support rails between the arm rest and the arm rest support rails held together by arm rest mount screws. Facing the wheel chair from the front the basket, desk top or tray is provided with a long rearwardly extended tubular rod mounted to the right bottom thereof to slidably extend into and be supported by the right mounting tube. A mount tube is fastened to the left bottom of the basket, desk top or tray and a rod member is slidably mounted in the left mounting tube for movement with a hand lever between forward and rear limit positions. In the forward position the rod member extends forward from the left mounting tube into the mount tube on the left bottom of the basket to give mounting support thereto. When the rod member is slid to the rear position the basket, desk top or tray may be rotated up out of the way with pivotal rotation of the tubular rod in the right mounting tube. The basket may be pushed out from an innermost position to an outer use position that is a limit position set by a spring loaded self lock limiting outward sliding movement of the long rearwardly extended tubular rod in its mounting tube. The structure permits pushing out the basket far enough to allow a person to stand behind the basket and yet prevent the basket from being pushed too far out. Further, the basket can be stored on the chair while it is not in use and even with a wheel chair in a collapsed storage state.

19 Claims, 11 Drawing Figures

CONVENIENCE BASKET, DESK TOP OR TRAY MOUNTING SYSTEM FOR WHEEL CHAIRS

Figure 1:
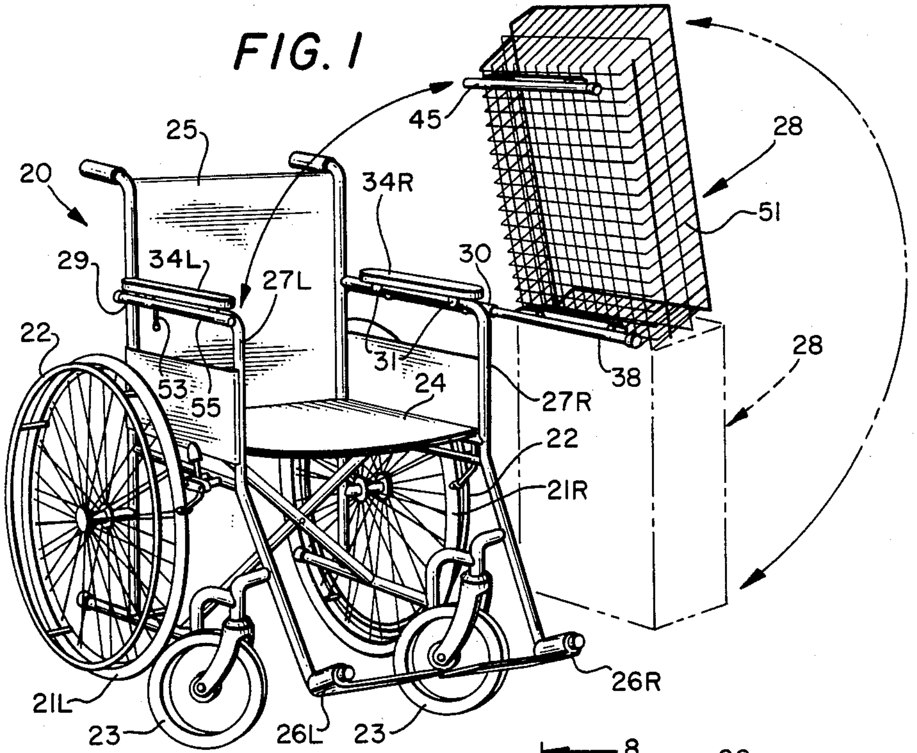

This invention relates in general to wheel chair equipment for the handicapped, and more particularly, to the convenience mounting of a basket, desk top or tray.

The handicapped particularly those who are confined to wheel chairs are faced with many problems in everyday life—shopping in stores, studying or writing and eating. In providing a convenience basket, desk top or tray mounting system for wheel chairs it is important that they be easily positioned, removed and/or stored and yet be sturdy and reliable in use with a high degree of safety for the user. It is important that the provision for mounting such a convenience basket, desk top or tray mounting system be mountable on a wheel chair without significant alteration of the wheel chair structure and without inhibiting the collapsability of a collapsable wheel chair for storage. The wheel chair confined handicapped appreciate having as much freedom to shop as possible, to study and write, and to eat conveniently. They like to be as self sufficient as possible and are thankful for any aids that help them to be so. Wheel chairs fitted with shopping convenience baskets could be kept on hand by supermarkets and other stores as an aid for the handicapped wanting the freedom to shop as much like everone else as possible. Obviously, safety considerations are of paramount importance so positioning limitations must be provided so as to not unbalance a wheel chair with a user occupant, and as much freedom of movement as reasonably possible should be provided for the user.

It is therefore a principal object of this invention to provide a shopping convenience basket, desk top or tray mounting system for wheel chairs broadening the utility spectrum of wheel chairs for the handicapped.

Another object is to provide a shopping basket adaption for wheel chairs enhancing the ability of the handicapped to do their own shopping in the store.

Still another object with such a shopping basket adaption is to provide for movement of the basket back and forward and positioning to a forward position permitting a wheel chair user to stand between the chair and the basket.

A further object is to provide such a shopping convenience basket, desk top or tray mounting system for wheel chairs that does not require any change in the basic wheel chair structure other than just minor disassembly, and reassembly.

Features of the invention useful in accomplishing the above objects include, in a shopping convenience basket, desk top or tray mounting system for wheel chairs two mounting tubes one to the outside and below each arm rest. They are mounted in place each with two loop over brackets fixed in place on the arm rest support rails between the arm rest and the arm rest support rails held together in assembly by arm rest mount screws without any machining alterations required of the basic wheel chair. From the front the basket, desk top or tray is provided with a long rearwardly extended tubular rod mounted to the right bottom thereof to slidably extend into and be supported by the right mounting rube. A mount tube is fastened to the left bottom of the basket, desk top or tray and a rod member is slidably mounted in the left mounting tube for movement with a hand lever between forward and rear limit positions. The hand lever extends through and slides along a slot in the left mounting tube in movement between rear and front positions held with the lever turned down in end stop openings extended downward from the slot. In the forward position the rod member extends forward from the left mounting tube into the mount tube on the left bottom of the basket to give mounting support thereto. When the rod member is slid to the rear position the basket, desk top or tray may be rotated up out of the way with pivotal rotation of the tubular rod in the right mounting tube. The basket may be pushed out from an innermost position to an outer use position that is a limit position set by a spring loaded self lock limiting outward sliding movement of the long rearwardly extended tubular rod in its mounting tube. The structure permits pushing out the basket far enough to allow a person to stand behind the basket and yet prevent the basket from being pushed too far out. Further, the basket can be stored on the chair while it is not in use and even with a wheel chair in a collapsed storage state. Manual depression of the spring loaded self lock permits removal of the basket, desk top or tray completely from the mounting tubes on the arm rest support rails and from the wheel chair.

Specific embodiments representing what are presently regarded as the best modes of carrying out the invention are illustrated in the accompanying drawings.

Figure 2:
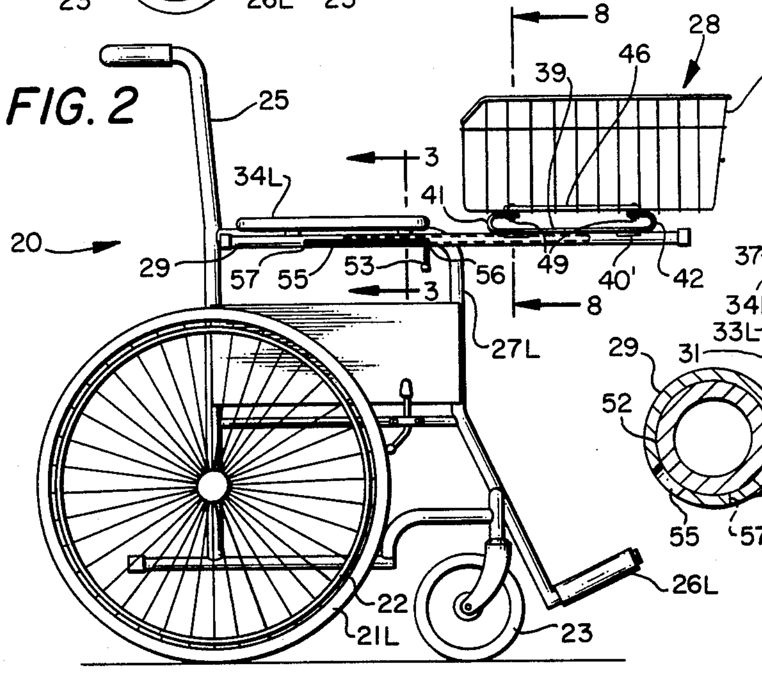
Figure 3:
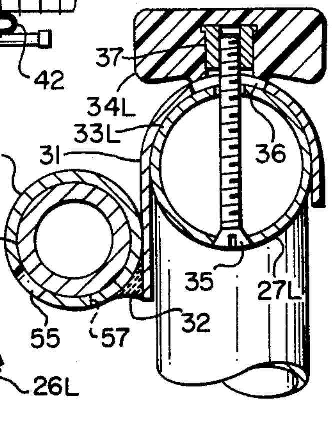
Figure 4:
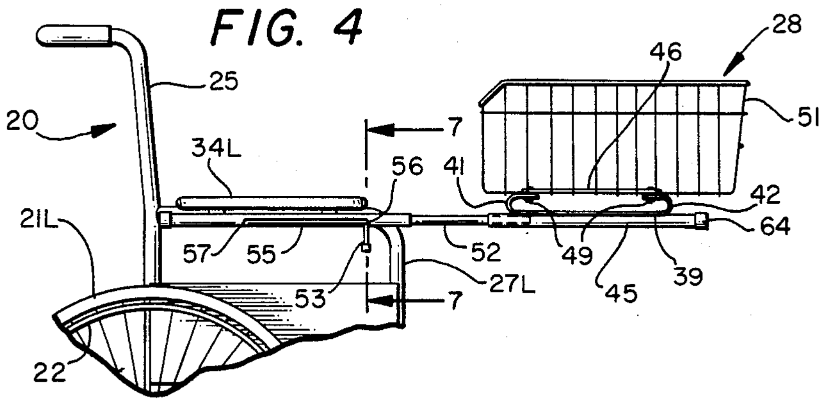
Figure 5:
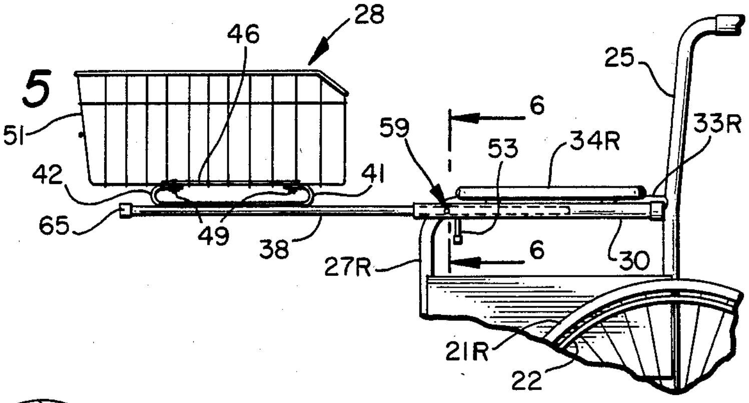
Figure 6:
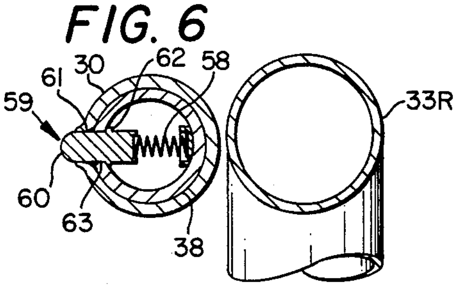
Figure 7:
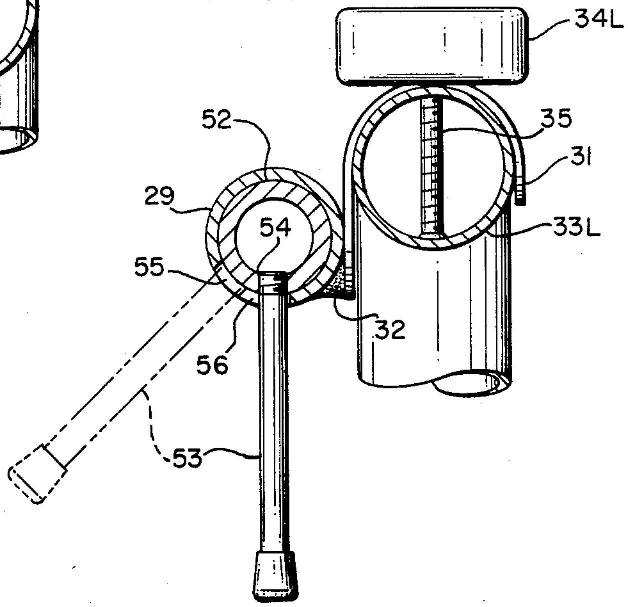
Figure 8:
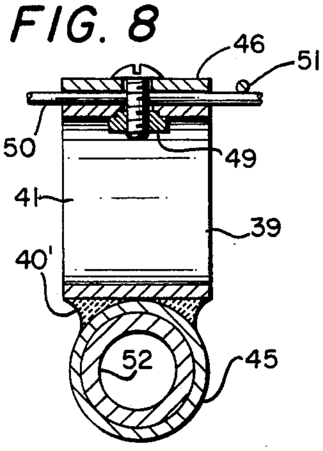
Figure 9:
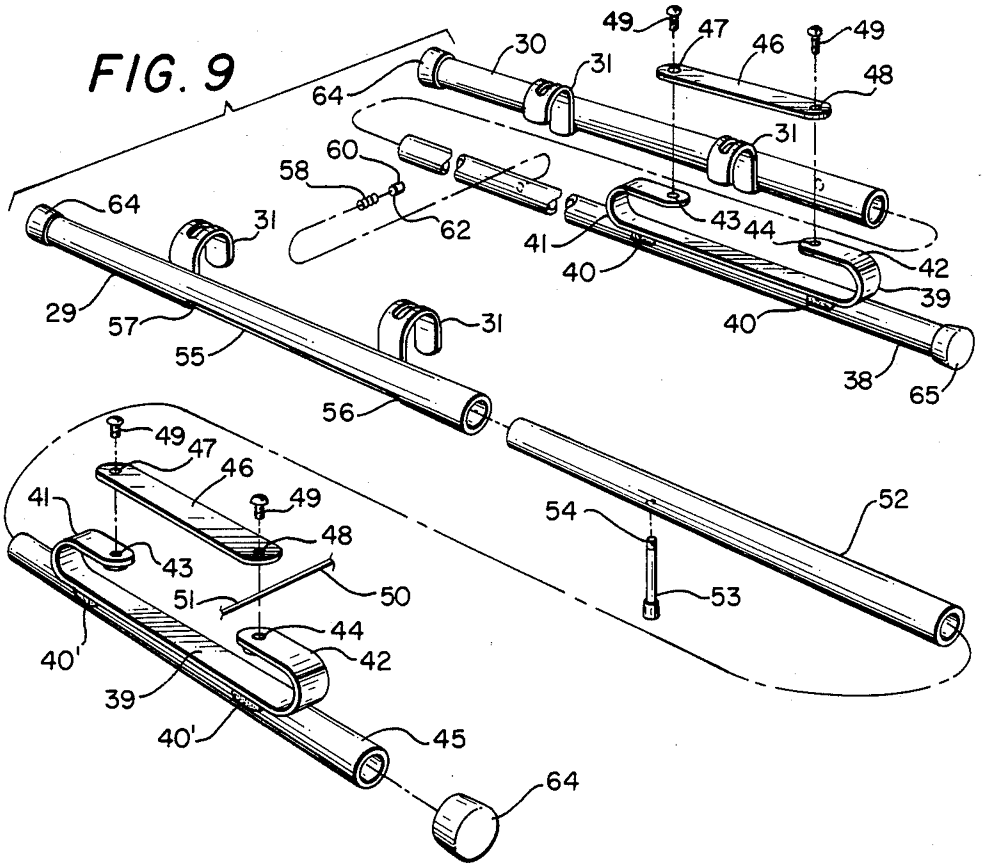
Figure 10:
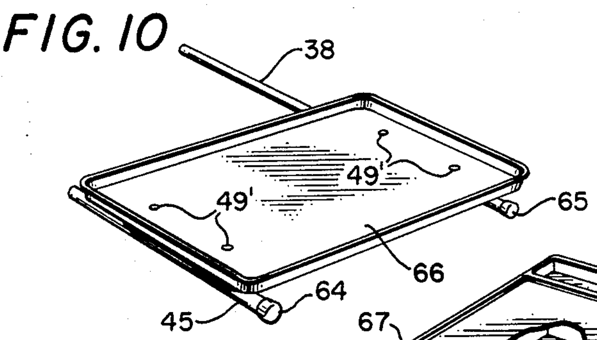
Figure 11:
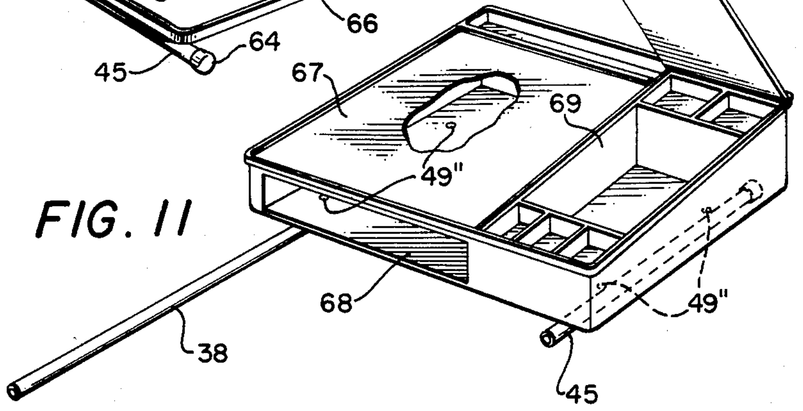

In the drawings:

FIG. 1 represents a perspective view of a collapsable wheel chair with the mount rod in the back withdrawn state and a shopping convenience basket pivoted up about its right hand mounting;

FIG. 2, a side elevation view of the wheel chair of FIG. 1 with the shopping convenience basket positioned for use;

FIG. 3, a partial cut away and sectioned view taken along line 3—3 of FIG. 2 showing mounting tube and rod mounting detail with a loop over bracket fixed in place on the left arm rest support rail between the arm rest and the rail held together by arm rest mount screws;

FIG. 4, a partial side elevation view of the wheel chair with the shopping convenience basket pushed out to the outer limit position from the innermost position of FIG. 2;

FIG. 5, a partial side elevation view of the wheel chair from the opposite side from the side of FIGS. 2 and 4 with the safety lock in place for the outer basket position;

FIG. 6, a partial cut away and sectioned view taken along line 6—6 of FIG. 5 showing safety lock detail;

FIG. 7, a partial cut away and sectioned view taken along line 7—7 of FIG. 4 showing the rod mount member with its positioning lever in the forward extended position in its mounting tube;

FIG. 8, a partial cut away and sectioned view taken along line 8—8 of FIG. 2 showing basket to mounting rod detail;

FIG. 9, an exploded perspective view showing the interrelated mounting components for the mounting of a shopping convenience basket on a wheel chair;

FIG. 10, a perspective view of a tray that could be mounted on a wheel chair; and, FIG. 11, a perspective view of a compartment equipped desk top that could be mounted on a wheel chair.

Referring to the drawings:

The wheel chair 20 of FIGS. 1 and 2 is shown to be a conventional type wheel chair with opposite side drive wheels 21L and 21R having handrims 22 and front caster wheels 23 and equipped with a collapsable canvas or plastic seat 24 and back 25. Foot supports 26L and 26R are also provided along with opposite side arm rest structures 27L and 27R. The wheel chair 20, however is adapted to mount shopping convenience basket 28 with, looking from the front, a left mounting tube 29 and a right mounting tube 30 with the mounting tubes outside and below the respective arm rests. Obviously, to an occupant user of the wheel chair 20 the left and right sides are the reverse from looking from the front but, throughout this description keep in mind that the right and left are as seen by a person looking at the wheel chair from the front. Each of the mounting tubes 29 and 30 are provided with two loop over brackets 31 that are welded 32 to the inner sides of the mounting tubes 29 and 30 to extend up and over the respective arm rest support rails 33L and 33R where they are fixed in place between the arm rests 34L and 34R and the arm rest support rails 33L and 33R. They are held together by arm rest mount screws 35 extended through the rails 33L and 33 R, openings 36 in brackets 31 and threaded mount inserts 37 in arm rests 34L and 34R as shown in FIG. 3.

Referring also to FIGS. 4 through 9 the shopping convenience basket 28 is provided with a long rearwardly extended tubular rod 38 mounted to the bottom thereof with a bracket 39 welded 40 to the top of rod 38 having opposite upward looped ends 41 and 42 with bolt holes 43 and 44, respectively. A duplicate bracket 39 welded 40' to the top of mount tube 45 also has opposite upward looped ends 41 and 42 with bolt holes 43 and 44. Two basket mounting straps 46 are also used, one for each of the brackets 39, with bolt holes 47 and 48 matching the spacing of bracket 39 bolt holes 43 and 44. Bolt assemblies 49 tighten the brackets 39 together with mounting straps 46 to enclose some basket wires 50 of the wire mesh 51 forming the basket 28 to mount the basket on tubular rod 38 and mount tube 45. An important feature of this basket mounting structure is that the transverse spacing of brackets 39 along with the two mounting straps 46 may be varied in adapting to varying wheel chair widths with different wheel chair sizes. Thus, the brackets 39 are capable of being moved a limited degree in their clamped mounting connection with respective clamp enclosed wires 50 in adjusting to arm rest width variations of wheel chairs and even the same wheel chair with different weight users seated therein. Tubular rod member 52 is slidably mounted in the left mounting tube 29 for movement with hand lever 53 between forward and rear limit positions. The hand lever 53 that is threaded 54 into the tubular rod member 52 extends through and is slidable along slot 55 in the left mounting tube 29 in movement between rear and front positions held with the lever 53 turned down in end stop openings, front 56 and rear 57, extended downward from the slot 55. In the forward position the tubular rod member 52 extends forward from the left mounting tube 29 into the basket mount tube 45 to give mounting support thereto. When the rod member 52 is slid to the rear position the basket 28 (desk top or tray) may be rotated up out of the way in a pivotal rotation about the pivotal axis of tubular rod 38 in the right mounting tube 30.

A spring 58 loaded self lock device 59 is provided in tubular rod 38 that has a position lock plunger 60 that snaps out into opening 61 in the right mounting tube 30 to thereby lock tubular rod 38 and basket 28 in an outer limit use position shown in FIGS. 4 and 5 when the rod and basket are pushed out from the innermost position of FIG. 2. Shoulder 62 on position lock plunger 60 engages the inner surface of tube 30 around opening 63 to limit outward travel of the plunger 60. Manual depression of position lock plunger 60 permits further outward movement of tubular rod 38 in removal thereof from right mounting tube 30 and dismounting of basket 28 from wheel chair 20, or return of the rod 38 and basket 28 to an inner position. Plastic end caps 64 are provided on the forward end of mount tube 45 and the rear end of mounting tubes 29 and 30 and an end cap 65 on the forward end of tubular rod 38 for protection from sharp end edges.

The tray 66 of FIG. 10 could be mounted on the wheel chair 20 in place of basket 28 with bolt assemblies 49' mounting the tray 66 on brackets 39 or directly to tubular rod 38 and mount tube 45.

With the desk top 67 embodiment of FIG. 11 a desk top 67 with compartments 68 and 69 with a pivot open top 70 is fastened directly to tubular rod 38 and mount tube 45 with bolt assemblies 49''. This desk top 67 and the tray 66 embodiment are positionable and interchangeably removable just as with the basket 28 embodiment of FIGS. 1 through 9.

Whereas this invention has been described with respect to several embodiments thereof, it should be realized that various changes may be made without departure from the essential contributions to the art made by the teachings hereof.

I claim:

1. A convenience receptacle mounting system for wheel chairs comprising: a convenience receptacle; a first mounting tube and a second mounting tube mounted outside respective arm rests of a wheel chair; a rod mounted to the bottom adjacent one side of the convenience receptacle and extended outwardly from the receptacle to be slidably and pivotally received in said second mounting tube; a mount tube mounted to the bottom parallel to said rod and adjacent the other side of the receptacle from the side of the rod mounting thereto; and a rod member slidably mounted in said first mounting tube for movement between a rear retracted position and a forward position extending from said first mounting tube to give mounting support therethrough to said receptacle.

2. The convenience receptacle mounting system for wheel chairs of claim 1, wherein each of said first and second mounting tubes are equipped with bracket mount means fixed in assembly with respective arm rests assembled to the wheel chair.

3. The convenience receptacle mounting system for wheel chairs of claim 2, wherein said bracket mount means includes loop over brackets fixed in place in the assembly mounting of arm rests on arm rest support rails of the wheel chair; and said loop over brackets mounting said first and second mounting tubes to the outside of and below each arm rest.

4. The convenience receptacle mounting system for wheel chairs of claim 2, wherein said first mounting tube is provided with a longitudinally extended slot with a rear retracted position stop opening extended transversely therefrom at the rear end of said slot, and a front extended position stop opening extended transversely therefrom at the front end of said slot; a lever mounted in said rod member and extended through and slidable along said slot between said rear retracted position and said front extended position.

5. The convenience receptacle mounting system for wheel chairs of claim 4, wherein said rod member with said lever in the rear retracted position is withdrawn from said mount tube mounted to the bottom of said receptacle and the receptacle is pivotal up and out of the way about the pivotal axis of said rod, mounted to the bottom of the receptacle, in said second mounting tube.

6. The convenience receptacle mounting system for wheel chairs of claim 5, wherein said receptacle is positionable for use between an innermost position and an outer position; and outer position lock means mounted for establishing a position lock between said rod, mounted to the bottom of said receptcale, and said second mounting tube.

7. The convenience receptacle mounting system for wheel chairs of claim 6, wherein said outer position lock means is resilient means biased lock means mounted in said rod; said lock means including a lock member engageable with a lock opening in said second mounting tube.

8. The convenience receptacle mounting system for wheel chairs of claim 7, wherein said lock opening extends to the exterior of said second mounting tube; and said outer position lock means lock member is a plunger accessable for manual depression from said lock opening for return of said rod and receptacle to a position to the rear from said outer limit lock position, or for removal of the rod with the receptacle from the wheel chair.

9. The convenience receptacle mounting system for wheel chairs of claim 8, wherein said rod is pivotal in said second mounting tube for pivoting said receptacle out of the way when said plunger is depressed to permit pivotal movement of said rod in said second mounting tube.

10. The convenience receptacle mounting system for wheel chairs of claim 9, wherein said mounting of said rod to the bottom of one side of the convenience receptacle and said mounting of said mount tube to the bottom of the other side of the receptacle includes use of a plurality of bolt assemblies.

11. The convenience receptacle mounting system for wheel chairs of claim 10, wherein said mounting of said rod to the bottom of one side of the convenience receptacle and said mounting of said mount tube to the bottom of the other side of the receptacle includes a plurality of bracket means welded to said rod and to said mount tube with upward looped opposite ends having bolt holes for said bolt assemblies.

12. The convenience receptacle mounting system for wheel chairs of claim 11, wherein said bracket mount means includes loop over brackets fixed in place in the assembly mounting of arm rests on arm rest support rails of the wheel chair; and said loop over brackets mounting said first and second mounting tubes to the outside of and below each arm rest.

13. The convenience receptacle mounting system for wheel chairs of claim 12, wherein said bracket mount means includes two loop over brackets on each of said first and second mounting tubes.

14. The convenience receptacle mounting system for wheel chairs of claim 12, wherein said convenience receptacle is a wire mesh basket; and two mounting straps are included one in the mounting of said rod to the bottom of one side of the convenience receptacle and one in the mounting of said mount tube to the bottom of the other side of the receptacle with two bolt holes in each mounting strap matching the spacing of bolt holes in each of said bracket means.

15. The convenience receptacle mounting system for wheel chairs of claim 13, wherein said convenience receptacle is a tray with two sets of bolt holes with bolt hole spacing in each set of bolt holes matching the spacing of bolt holes in each of said bracket means.

16. The convenience receptacle mounting system for wheel chairs of claim 10 wherein said convenience receptacle is a tray bolted to said rod and to said mount tube.

17. The convenience receptacle mounting system for wheel chairs of claim 10, wherein said convenience receptacle is a desk top bolted to said rod and to said mount tube.

18. The convenience receptacle mounting system for wheel chairs of claim 10, wherein said rod mounted to the bottom at one side of the convenience receptacle is extended outwardly from the receptacle approximately to the extent of the front to rear length of said receptacle.

19. The convenience receptacle mounting system for wheel chairs of claim 14, wherein said two mounting straps and said bracket means may be tightened in place on wires of the wire mesh basket at different transverse spacings in adapting to the width of individual wheel chairs through a range of wheel chair arm rest spacings with different size wheel chairs.

* * * * *